No. 750,164. PATENTED JAN. 19, 1904.
J. CAMPBELL.
FERTILIZER DISTRIBUTER.
APPLICATION FILED JULY 1, 1903.
NO MODEL.
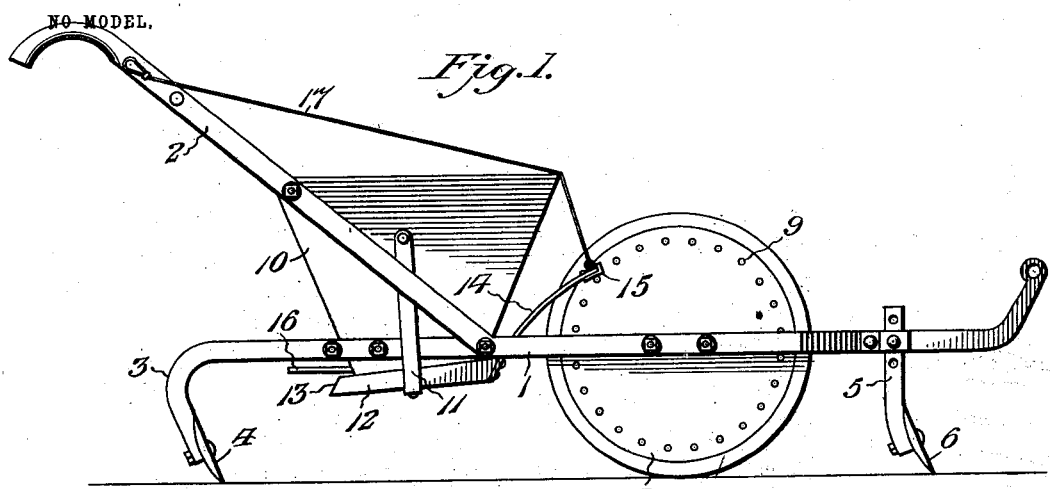
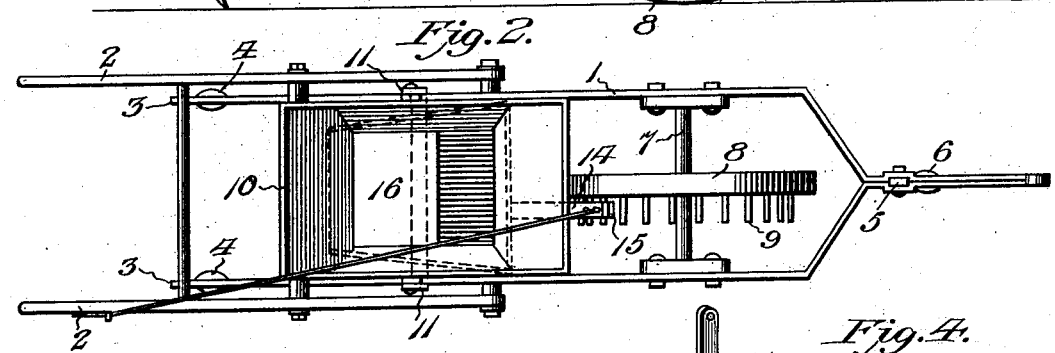
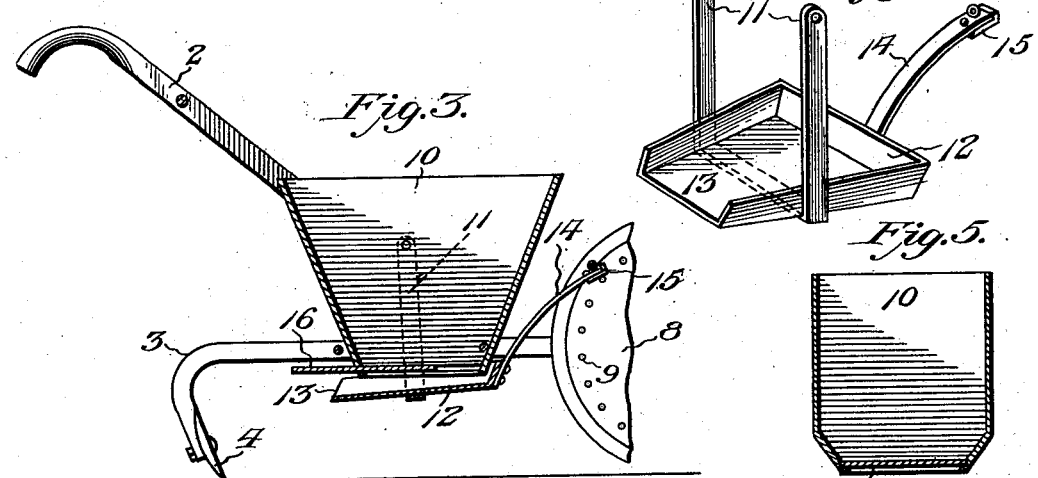
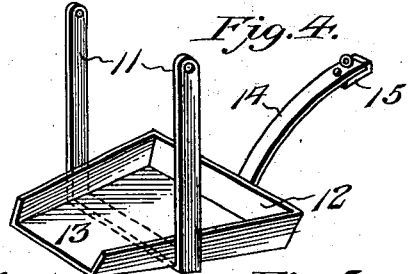
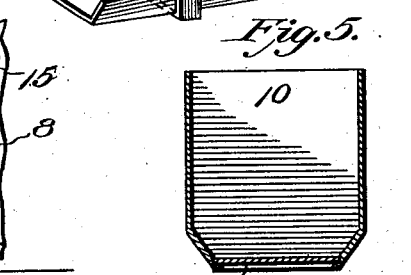
Inventor
John Campbell No. 750,164.

Patented January 19, 1904.

UNITED STATES PATENT OFFICE.

JOHN CAMPBELL, OF SAM, GEORGIA.

FERTILIZER-DISTRIBUTER.

SPECIFICATION forming part of Letters Patent No. 750,164, dated January 19, 1904.

Application filed July 1, 1903. Serial No. 163,921. (No model.)

*To all whom it may concern:*

Be it known that I, JOHN CAMPBELL, a citizen of the United States, residing at Sam, in the county of Bulloch and State of Georgia, have invented new and useful Improvements in Fertilizer-Distributers, of which the following is a specification.

My invention relates to fertilizer-distributers; and its object is to provide a simple and inexpensive machine which is light and durable and can be readily drawn over a field.

A further object is to provide means whereby the fertilizer can be discharged automatically in desired quantities from the machine.

With the above and other objects in view the invention consists in mounting a frame upon a wheel having a series of pins extending laterally therefrom. A hopper is secured to the frame and has a movable bottom, and a spring extends therefrom and bears upon one of the pins. An outlet is formed at one end of the movable bottom, and means are provided for regulating the flow of fertilizer through the outlet.

The invention also consists in the further novel construction and combination of parts, hereinafter more fully described and claimed, and illustrated in the accompanying drawings, showing the preferred form of my invention, and in which—

Figure 1 is a side elevation of the fertilizer-distributer. Fig. 2 is a plan view. Fig. 3 is a vertical longitudinal section through the hopper. Fig. 4 is a detail view of the hopper-bottom, and Fig. 5 is a transverse section through the hopper.

Referring to the figures by numerals of reference, 1 is a frame having handles 2 extending rearwardly therefrom and provided with a suitable number of downwardly-extending standards 3, to which plows 4 are connected. An adjustable standard 5 is mounted in the forward end of the frame, and a plow 6 is secured thereto. Mounted upon an axle 7, arranged within the frame, is a wheel 8, having a series of pins 9 extending laterally therefrom near the periphery thereof. A hopper 10 is secured upon the frame, and hangers 11 are pivoted to opposite sides thereof and are connected at their lower ends to a tapered shovel-like bottom 12, having an outlet 13 at its rear end. A spring-arm 14 is secured to this bottom-section and has a wear-plate 15 at its free end, which is contacted by the pins 9. A slide 16 is arranged within the hopper and is adapted to regulate the flow of material from said hopper into the bottom-section 12 and through the outlet 13. A cord 17 is connected to the arm 14 and extends backward to the handles 2. By means of this cord the arm 14 can be moved out of the path of the pins 9.

When the machine is drawn forward, the pin 9, upon which the arm 14 rests, is drawn from under said arm, causing the hopper-bottom to swing backward until the arm comes in contact with the next pin. This movement will be continued as long as the wheel revolves. An oscillating movement will thus be imparted to the hopper, and the fertilizer therein after falling upon the bottom-section 12 will be gradually moved through the outlet 13. It will be obvious that the quantity of fertilizer discharged from the hopper may be regulated by means of the slide 16. The plow 6 may be employed for opening the furrow, while the plows 4 are preferably employed for throwing the soil over the fertilizer.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

The combination with a frame having an axle detachably secured therein, and handles secured to the frame; of a wheel loosely mounted upon the axle, pins extending laterally therefrom, a hopper secured within the frame and to the handles and having an outlet, a hanger pivoted at its ends to the sides of the hopper and extending under the outlet of the hopper, a bottom mounted upon the hanger and having an outlet at the rear end thereof, said bottom having flanges overlapping the outlet end of the hopper, a spring-arm secured to and extending from the bottom of the hopper, a wear-plate upon the arm and adapted to be successively contacted by the pins, a slide within the outlet of the hopper and adapted to close the same, and a flexible strip secured at opposite ends to the spring-arm and one of the handles, respectively.

In testimony whereof I affix my signature in presence of two witnesses.

JOHN CAMPBELL.

Witnesses:
FRED T. LANIER,
W. J. WILSON.